United States Patent [19]

Soecknick et al.

[11] 4,205,530

[45] Jun. 3, 1980

[54] COOLING APPARATUS FOR COVERED METALS

[75] Inventors: Erhard Soecknick, Düsseldorf; Jürgen Busse, Monchen-Gladbach, both of Fed. Rep. of Germany

[73] Assignee: Messer Griesheim GmbH, Frankfurt am Main, Fed. Rep. of Germany

[21] Appl. No.: 947,342

[22] Filed: Oct. 2, 1978

[30] Foreign Application Priority Data

Oct. 8, 1977 [DE] Fed. Rep. of Germany ....... 7731229

[51] Int. Cl.² .............................................. F25D 17/02
[52] U.S. Cl. .......................................... 62/64; 62/373
[58] Field of Search .................... 157/1.1, 1.17; 62/62, 62/64, 320, 373, 331

[56] References Cited

U.S. PATENT DOCUMENTS

| | | | |
|---|---|---|---|
| 2,537,189 | 1/1951 | King | 157/1.17 |
| 2,565,063 | 8/1951 | Briscoe et al. | 62/64 |
| 4,033,737 | 7/1977 | Kunioka et al. | 62/64 |

FOREIGN PATENT DOCUMENTS 228296  5/1960  Australia ................................. 62/64

Primary Examiner—Ronald C. Capossela
Attorney, Agent, or Firm—Connolly and Hutz

[57] ABSTRACT

An apparatus for cooling rubber covered wheels having a hard rubber covering which is to be removed by cold shrinkage includes a horizontally arranged insulated support disc for the wheel and an insulated cover cap for covering the wheel on the disc with a slot-shaped space being formed between the cover cap and wheel in the area of the wheel rim and with at least one supply pipe disposed in the space for feeding a liquid coolant agent.

10 Claims, 1 Drawing Figure

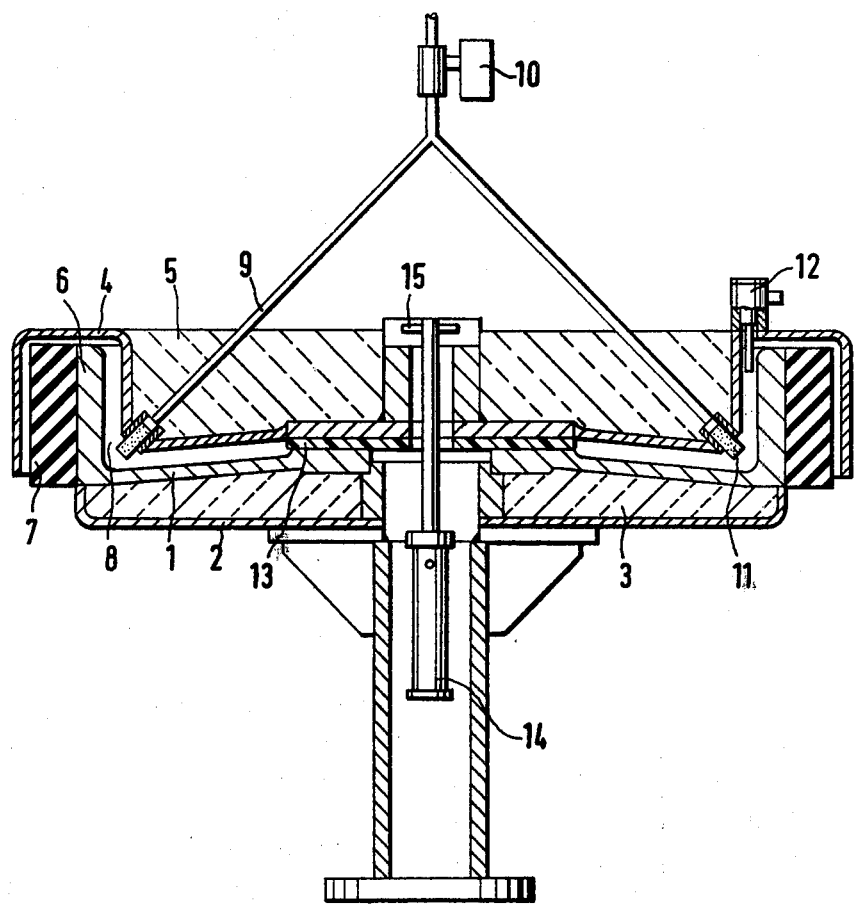

COOLING APPARATUS FOR COVERED METALS

BACKGROUND OF INVENTION

The invention relates to a cooling apparatus for rubber covered wheels, the hard rubber covering of which is to be removed by means of cold embrittlement.

Rubber covered wheels consist of a metal hub of steel or aluminum with a hard rubber covering is removed. This means that the damaged or used hard rubber is completely separated from the metallic hub. Several methods are known for this purpose. There are purely mechanical processes according to which the hard rubber is turned down or milled off. The entire rubber covering is pressed off according to another method by means of a press after which the remaining rubber is turned down. The metallic hub is heated according to another process principle by induction after which the rubber covering can easily be removed. This method can only be applied with steel hubs, to be sure, since temperatures of 350° C. are used in this process whereby unacceptable structure changes already take place in aluminum.

It is further known to cool the entire wheel to low temperatures, for example, by means of a low boiling liquid gas. The different shrinkage behavior of the individual materials combined with the cold embrittlement of the rubber effects and facilitates here the separation. The disadvantage of this method is the high consumption of cooling agent, for example, of liquid nitrogen, since the specific heat of rubber is about three times as high as that of aluminum or steel.

SUMMARY OF INVENTION

The invention is, therefore, based on the objective of providing a cooling apparatus for rubber covered wheels, the hard rubber covering of which is to be removed by means of cold shrinkage, which makes a considerable reduction of the specific cooling agent consumption possible.

This is attained according to the invention by a horizontally arranged insulated support disc for the rubber covered wheel to be supported as well as an insulated cover cap for covering the rubber covered wheel located on the support disc, which forms a slot-shaped space with the rubber covered wheel at least in the area of the rim which carries the hard rubber covering, which space is connected with at least one supply pipe for a liquid cooling agent.

The cooling agent, for example, liquid nitrogen fills in this case the slot-shaped space to a certain level as a result of which the metallic hub is drastically cooled. The hub shrinks and breaks loose from the rubber covering which is cooled only slightly. Since the cooling apparatus according to the invention makes a separate cooling of the metallic wheel hub possible, the cooling agent for cooling the hard rubber covering which is indispensible for the presently ususal cooling of the entire rubber covered wheel is left out. When using liquid nitrogen as the cooling agent, the specific nitrogen consumption per wheel can be reduced by about 30%.

In an advantageous further development of the cooling apparatus according to the invention, the filling level of the cooling liquid in the slot-shaped space is checked by means of a thermosensor. Bracing and locking of the cover cap with the rubber covered wheel can take place with any means, for example, with screws. A pneumatic bracing and locking mechanism is advantageous, however, for a quick and simple operation.

An exact positioning of the rubber covered wheel on the support disc is achieved when the support disc has a contour fitted to the rubber covered wheel to be supported. Inasmuch as a low boiling liquified gas is used as a cooling agent, gas phase separators are preferably provided at the nozzles of the supply pipes in the cover cap, which make a further reduction of the cooling agent consumption possible.

THE DRAWING

The drawing shows an examplified embodiment of the invention in cross section.

DETAILED DESCRIPTION

Cooling of the rubber covered wheel shown in the drawing takes place by means of liquid nitrogen. The rubber covered wheel 1 rests on a horizontally arranged support disc 2 which is provided with an insulation 3. The insulation 3 has a contour fitted to the rubber covered wheel 1. On the rubber covered wheel 1 rests a cover cap 4 which is also provided with an insulation 5. The cover cap 4 is shaped in such a way that it forms a slot-shaped space 8 with the rubber covered wheel 1 especially in the area of the rim 6 which carries the hard rubber covering 7. This slot-shaped space 8 is filled with liquid nitrogen which is supplied by supply pipes 9 provided with a valve 10 via gas phase separators 11. The filling level of the liquid nitrogen is checked by means of the thermosensor 12. Sealing of the slot-shaped space 8 takes place by means of a seal 13, towards the center of the wheel. The evaporating cold gas is conducted past the hard rubber covering 7 conforming to the shape of the cover cap 4. The filling level is maintained in the actual/desired value comparison via a control until a cooling off of the metallic wheel hub has taken place. The cooling period is preset by means of an electrical time relay.

Bracing of the cover cap 4 takes place by means of a pneumatic cylinder 14 which is connected with the cover cap 4 by means of a locking mechanism 15.

It is advantageous to slit the covering parallel to the axis before cooling since this facilitates separation. After completion of the cooling of the metallic wheel hub, the hard rubber covering can be easily removed without impact stress.

What is claimed is:

1. In a cooling apparatus for rubber covered wheels, the hard rubber covering of which is to be removed from the rim of the wheel by means of cold shrinkage, the improvement being a horizontally arranged insulated support disc for the rubber covered wheel to be supported, an insulated cover cap mounted over said support disc and spaced therefrom for covering the rubber covered wheel located on said support disc, said cover cap being spaced from said disc to form a slot-shaped space with respect to the rubber covered wheel at least in the area of the rim which carries the hard rubber covering, and at least one supply pipe communicating with said space for feeding liquid cooling agent thereto.

2. Cooling apparatus according to claim 1, characterized by a thermosensor for controlling the filling level of the cooling liquid in said slot-shaped space.

3. Cooling apparatus according to claim 2, characterized by a pneumatic bracing and locking mechanism for securing said cover cap with the rubber covered wheel and said support disc.

4. Cooling apparatus according to claim 3, characterized in that said support disc has a contour for being fitted to the rubber covered wheel to be supported.

5. Cooling apparatus according to claim 4, characterized by each said supply pipe having a gas phase separator on the nozzles of said supply pipe in said cover cap.

6. Cooling apparatus according to claim 1, characterized by a pneumatic bracing and locking mechanism for securing said cover cap with the rubber covered wheel and said support disc.

7. Cooling apparatus according to claim 1, characterized in that said support disc has a contour for being fitted to the rubber covered wheel to be supported.

8. Cooling apparatus according to claim 1, characterized by each said supply pipe having a gas phase separator on the nozzles of said supply pipe in said cover cap.

9. In a method for removing by cold shrinkage the hard rubber covering from the rim of rubber covered wheels, the improvement being mounted the rubber covered wheel on a horizontally arranged insulated support disc with the rim extending upwardly away from the support disc, covering the wheel with an insulated cover cap which is spaced from the wheel to create a slot-shaped space in at least the area of the rim of the wheel, and supplying a liquid cooling agent into the slot-shaped space through at least one supply pipe communicating with the space.

10. In a method of claim 9 including controlling the filling level of the liquid in the space by means of a thermosensor, utilizing as the disc a disc having a contour fitted to the wheel, and feeding the liquid cooling agent through a gas phase separator on the nozzle of each supply pipe.

* * * * *